(12) United States Patent
Lhermite (10) Patent No.: US 8,174,243 B2
(45) Date of Patent: May 8, 2012

(54) POWER SUPPLY CONTROLLER AND METHOD THEREFOR

(75) Inventor: Francois Lhermite, Lasserre (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1181 days.

(21) Appl. No.: 11/917,315

(22) PCT Filed: Mar. 19, 2007

(86) PCT No.: PCT/US2007/064270
§ 371 (c)(1),
(2), (4) Date: Dec. 12, 2007

(87) PCT Pub. No.: WO2008/115232
PCT Pub. Date: Sep. 25, 2008

(65) Prior Publication Data
US 2009/0296425 A1    Dec. 3, 2009

(51) Int. Cl.
*H02J 7/06*  (2006.01)
*G05F 1/33*  (2006.01)
*H02M 3/335* (2006.01)

(52) U.S. Cl. .............. 320/164; 323/251; 363/21.03
(58) Field of Classification Search ............... 363/21.03, 363/21.15; 320/162–164; 323/235, 251, 323/254
See application file for complete search history.

(56) References Cited

U.S. PATENT DOCUMENTS

| | | | | |
|---|---|---|---|---|
| 5,757,627 A | * | 5/1998 | Faulk ............. | 363/21.14 |
| 5,764,495 A | * | 6/1998 | Faulk ............. | 363/21.13 |
| 5,768,118 A | * | 6/1998 | Faulk et al. ..... | 363/72 |
| 5,841,641 A | * | 11/1998 | Faulk ............. | 363/21.14 |
| 6,728,117 B2 | * | 4/2004 | Schemmann et al. | 363/21.12 |

* cited by examiner

*Primary Examiner* — Richard V Muralidar
(74) *Attorney, Agent, or Firm* — Robert F. Hightower (57) ABSTRACT

In one embodiment, a switching controller uses an auxiliary winding voltage of a transformer to form a signal representative of current flow through a secondary winding of the transformer. The controller is configured to limit a current through a secondary winding to a maximum value.

15 Claims, 5 Drawing Sheets

FIG. 5 understand # POWER SUPPLY CONTROLLER AND METHOD THEREFOR

BACKGROUND OF THE INVENTION

The present invention relates, in general, to electronics, and more particularly, to methods of forming semiconductor devices and structure.

In the past, various configurations were used to form power supply controllers that controlled an output voltage on a secondary side of transformer by controlling current flow through a primary side of the transformer. In some cases, and optical coupler was utilized to sense the value of the output voltage and form a feedback signal that was used to control the current through the primary side. However, this added cost to the system. In other cases, the transformer included an auxiliary winding into which a voltage was induced from the primary side of the transformer. The signals on the auxiliary winding were used to control a power supply controller connected to the primary side of the transformer. One such control circuit is disclosed in U.S. Pat. No. 7,102,899 issued to Reinhard et al on Sep. 5, 2006. One problem with these prior circuits was the accuracy of the regulation of the output voltage when using the auxiliary winding as a control signal. Typically, the accuracy was less than approximately ten percent. Another problem was limiting the value of the current in the secondary winding to a maximum value. Without connecting directly to the secondary winding, it was difficult to limit the value of the secondary current.

Accordingly, it is desirable to have a control method that reduces the system cost, that does not utilize an optical coupler to form a feedback signal, that has improved accuracy, and that limits the value of the secondary current.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action. The use of the word substantially means that a value of element has a parameter that is expected to be very close to a stated value or position. However, as is well known in the art there are always minor variances that prevent the values or positions from being exactly as stated. It is well established in the art that variances of up to about ten percent (10%) are regarded as reasonable variances from the ideal goal of exactly as described.

DETAILED DESCRIPTION OF THE DRAWINGS

Figure 1:
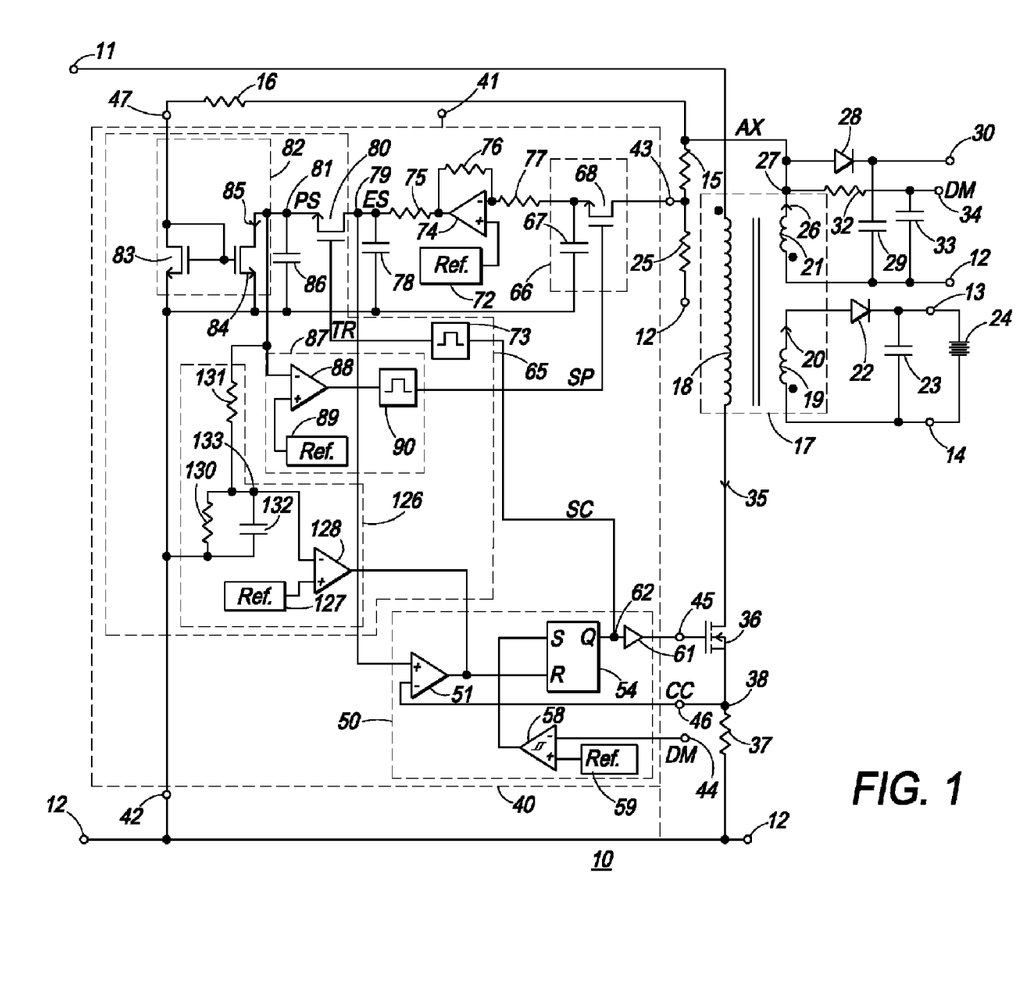
FIG. 1 schematically illustrates an embodiment of a portion of a power supply system in accordance with the present invention.

FIG. 1 schematically illustrates an exemplary form of an embodiment of a portion of a power supply system 10 that is connected in a quasi-resonant flyback configuration. System 10 receives power, such as a DC voltage, between a power input 11 and a power return 12 and forms a regulated output voltage that is used for various applications such as to charge a battery 24. A transformer 17 of system 10 has a primary side inductor or winding 18, a secondary side inductor or winding 19, and an auxiliary inductor or auxiliary winding 21. Secondary winding 19 is utilized to form the regulated output voltage between an output 13 and an output return 14. A load current or secondary current 20 flows through winding 19. A rectifier diode 22 and a capacitor 23 are used to rectify the voltages formed by winding 19 and form a substantially DC output voltage. A switching power supply controller 40 of system 10 is utilized to control the switching of a power switch 36 in order to regulate the value of the output voltage between output 13 and return 14. A current sense resistor 37 is connected to receive a current 35 from transistor 36 and form a current control (CC) signal on a node 38 that is utilized to limit the value of current 35 through inductor 18.

The switching of transistor 36 induces an auxiliary (AX) voltage on a terminal 27 of winding 21 and induces an auxiliary current 26 that flows through winding 21. A diode 28 and a capacitor 29 are connected to receive the AX voltage and form an operating voltage between a power terminal 30 and return 12 that is utilized for operating controller 40. A resistor 32 and a capacitor 33 receive the auxiliary (AX) voltage from terminal 27 and form a de-magnetization or Dmag (DM) signal on an output 34. The value and waveshape of the Dmag (DM) signal is substantially equal to the waveshape and value of the voltage across winding 21 but is delayed in time by the time constant of resistor 32 and capacitor 33.

Since all windings of transformer 17 are magnetically coupled together, windings 19 and 21 each produce a voltage identical to each other in shape but with a value that is proportional to their respective number of turns. So, regulating the voltage on winding 21 results in regulating the voltage on the winding 19. The effective output voltage is equal to the voltage developed on winding 19 minus the forward voltage drop of diode 22. Consequently, system 10 regulates the value of the output voltage to a target value within a range of values around the target value. For example, the target value may be ten volts (10 V) and the range of values may be plus or minus five percent (5%) around the five volts.

Controller 40 is connected into the primary side of system 10 and the voltages of controller 40 are referenced to the primary side. In order to determine the value of and regulate the output voltage, switching controller 40 is configured to receive the auxiliary (AX) voltage from auxiliary winding 21 and generate a pseudo current sense (PS) signal at a node 81 that is representative of the value and waveshape of current 20. The pseudo current sense (PS) signal is utilized to control a time at which controller 40 samples the value of the auxiliary voltage and determines the value of the output voltage. In addition, the sampled value of the auxiliary voltage is utilized to form an error signal (ES) that assist controller 40 in regulating the value of the output voltage. The error signal (ES) is also used to form the pseudo current sense (PS) signal. Generating the PS signal allows controller 40 to regulate the output voltage without being directly connected to or electrically referenced to secondary winding 19.

Controller 40 is connected to receive power from output 30 and return 12 through a voltage input 41 and a voltage return 42. Input 41 and return 42 are typically connected to output 30 and return 12, respectively. Controller 40 also includes a sense input 43 that is connected to receive the auxiliary (AX) voltage, an output 45 that is connected to control transistor 36, a current control (CC) input 46, a Dmag (DM) input 44, and a sense input 47. Input 44 generally is connected to Dmag (DM) output 34 in order to receive the DM signal. Input 47 is connected to receive the AX voltage through an external resistor 16.

A switching control section 50 of controller 40 includes a comparator 51, a switching control latch 54, a buffer driver 61, a hysteresis comparator 58, and a reference voltage generator or reference or ref 59. A signal processing section of controller 40 includes an auxiliary (AX) sampling circuit 66, a pseudo signal generator circuit 65, and an error amplifier 74 that includes feedback and gain control resistors 76 and 77 in addition to frequency compensation components that include a resistor 75 and a capacitor 78. Resistor 75 and capacitor 78 form a pole that is used to stabilize the operation of system 10. A reference generator circuit or ref 72 provides a reference voltage for amplifier 74. AX sampling circuit 66 includes a sampling switch such as a transistor 68, and a storage element such as a capacitor 67. Pseudo signal generator circuit 65 includes a sampling switch such as a transistor 80, a second storage element such as a capacitor 86, a decay matching circuit 82, a negative edge detector 73, a current limit circuit 126, and a zero crossing detection circuit or zero crossing detector or ZCD 87. ZCD 87 includes a comparator 88, a reference generator or ref 89, and a positive edge detection circuit 90. Current limit circuit 126 includes a comparator 128, a reference generator of ref 127, and an integrator that includes a capacitor 132 and resistors 130 and 131. Decay matching circuit 82 includes a current a current mirror formed by current mirror connected transistors 83 and 84. External current shaping resistor 16 assists in the operation of circuit 82. Elements of controller 40, such as switching control section 50, amplifier 74, ZCD 87, and circuit 65, usually are connected to receive operating power between input 41 and return 42.

Figure 2:
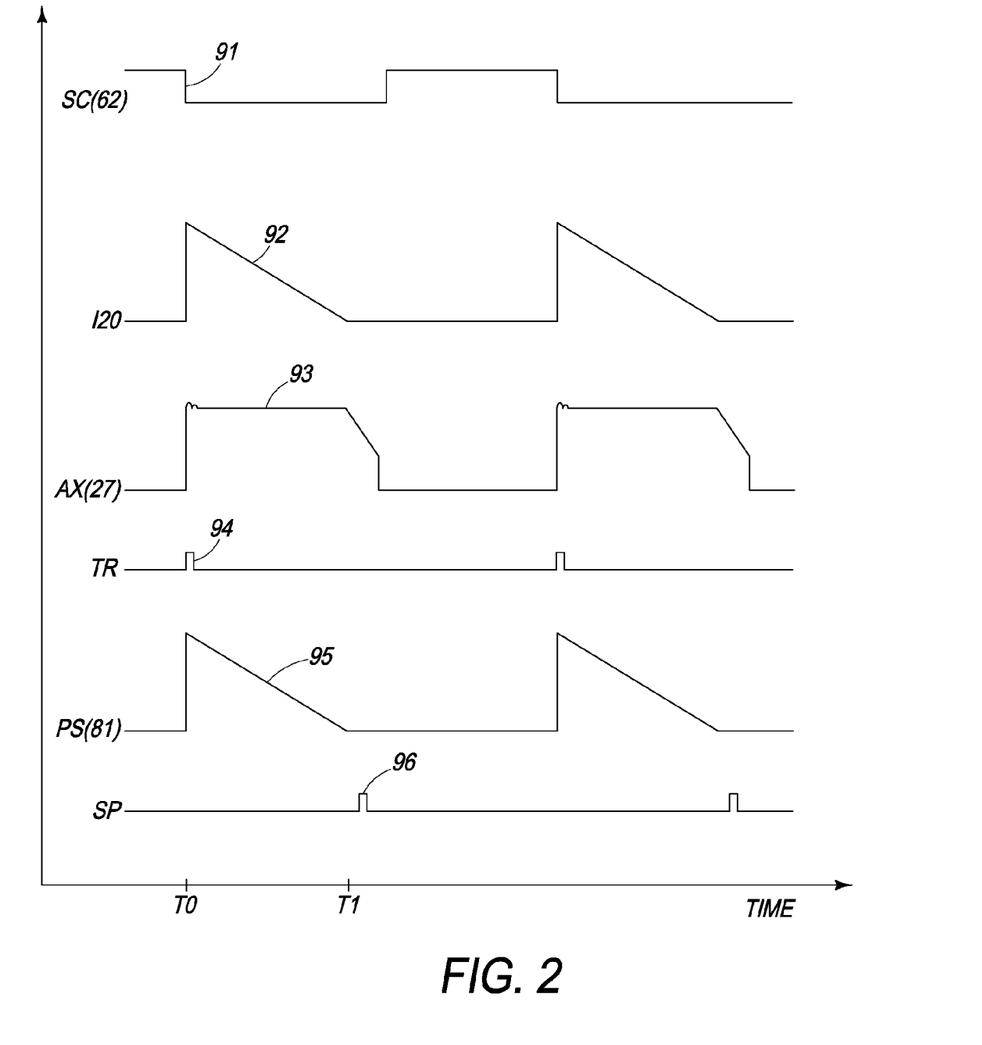
FIG. 2 is a graph that graphically illustrates some of the signals of the system of FIG. 1 in accordance with the present invention.

FIG. 2 is a graph having plots that graphically illustrate of some of the signals of system 10. The abscissa indicates time and the ordinate indicates increasing value of the illustrated signal. A plot 91 illustrates the switching control (SC) signal on node 62. A plot 92 illustrates current 20 through secondary winding 19. A plot 93 illustrates the AX voltage on terminal 27. A plot 94 illustrates a transfer (TR) signal on the output of edge detector 73. A plot 95 illustrates the PS signal on node 81, and a plot 96 illustrates a sampling signal (SP) on the output of edge detector 90. This description has references to FIG. 1 and FIG. 2.

In operation, because secondary current 20 flows through diode 22, the voltage drop across diode 22 causes the output voltage to be dependent on the value of current 20. Consequently, the auxiliary voltage and the DM signal are different from the output voltage by the value of the voltage across diode 22. For large values of current 20, the drop across diode 22 is also large, and as the value of current 22 decreases the forward drop across diode 22 also decreases. At the point that current 20 in diode 22 reaches substantially zero, the forward drop across diode 22 is at a minimum forward voltage of diode 22 and the voltage across diode 22 becomes substantially constant at the minimum forward drop of diode 22. At that point, the value of the AX voltage is representative of the output voltage plus the constant value of the forward drop across diode 22. Thus, the value of the AX voltage can be used as a feedback signal to represent the output voltage. Controller 40 uses the sampling (SP) signal to sample the AX voltage and form a sampled signal on capacitor 67 when the value of current 26 is substantially zero. Since the AX voltage is proportional to the voltage across winding 19 and has the same waveshape, the AX voltage is sampled when current 20 is substantially zero. The sampled signal is representative of the value of the auxiliary (AX) voltage, thus the output voltage, when the value of current 20 is substantially zero. Error amplifier 74 uses the sampled value from capacitor 67 to form an error signal (ES) that is representative of a deviation between the value of the output voltage and a desired value of the output voltage. Switching controller 50 uses the ES signal to form the switching control (SC) signal and control transistor 36. Pseudo signal generator circuit 65 stores a value of the error (ES) signal on capacitor 86 when the switching control signal (SC) goes low to disable transistor 36. Decay circuit 82 discharges capacitor 86 at a rate that is substantially equal to the rate at which current 20 decays so the value and waveshape of the PS signal is proportional to the value and waveshape of current 20. Current limit circuit 126 forms a signal on node 133 that is representative of the average value of current 20 and limits the value of current 20 responsively to the value of current 20 being no less than a desired value.

While the switching control (SC) signal is high to enable transistor 36, current 35 flows through inductor 18. Assume for purposes of explanation that capacitor 67 previously stored a value that is proportional to the value of the AX voltage. Error amplifier 74 receives the stored value and forms the error signal (ES) that is representative of the deviation between the output voltage and the desired value of the output voltage. The value of the ES signal is stored on capacitor 78. Controller 50 compares the ES signal to the CC signal to determine the proper value of current 35 at which to disable transistor 36. At some point, the value of the ES and CC signals cross and the output of comparator 51 goes high to reset latch 54. The low from latch 54 forces the SC signal low to begin disabling transistor 36 and inhibit current 35 as illustrated by plot 91 at a time T0. The change in current 35 induces current 20 to flow through secondary winding 19 and current 26 to flow through auxiliary winding 21 as illustrated by plot 92 at time T0. The change in current 35 also induces a secondary voltage across winding 19. Diode 22 and capacitor 23 rectify and filter the secondary voltage to form the output voltage between output 13 and return 14. The change in current 35 also induces the auxiliary (AX) voltage between terminal 27 and return 12 as illustrated by plot 93. Diode 28 and capacitor 29 rectify and filter the auxiliary voltage to form the operating voltage on output 30. Resistor 32 and capacitor 33 receive the auxiliary voltage and form the Dmag (DM) signal between output 34 and return 12.

The auxiliary (AX) voltage is also applied across the resistance of resistor 16 and the on-resistance of transistor 83 which forms a current flowing through transistor 83. Typically, the value of resistor 16 is much higher than the on-resistance of transistor 83 so that resistor 16 and the value of the auxiliary voltage determine the value of the current flowing through transistor 83. Transistors 83 and 84 are connected in a current mirror configuration so that the value of current 85 through transistor 84 is ratioed to the value of the current through transistor 83 by the size ratio between transistors 83 and 84. Thus, current 85 through transistor 84 is representative of the AX voltage. Current 85 is utilized to discharge the voltage stored on capacitor 86. Because current 85 is representative of the AX voltage, the pseudo signal (PS) formed at a node 81 is representative of the value and waveshape of current 20. Since the PS signal is proportional to current 20, the pseudo (PS) signal reaches zero at substantially the same time that current 20 reaches zero as illustrated by plots 92 and 95 at a time T1. When the PS signal reaches zero the output of zero crossing detector 87 goes high. Edge detector 90 detects the rising edge from comparator 88 and forms a narrow pulse that enables transistor 68 to store on capacitor 67 a feedback (FB) signal that is representative of the auxiliary (AX) voltage, thus, representative of the output voltage. The FB signal is formed by a voltage divider configured by resistors 15 and 25. Error amplifier 74 uses the sampled signal on capacitor 67 to form the ES signal. The pulse from edge detector 90 is just wide enough to enable transistor for a time sufficient to charge capacitor 68 to the value of the FB signal.

Current limit circuit 126 forms a signal that is representative of the average value of current 20 and decreases the on-time of transistor 36 responsively to the average value of current 20 being greater than a desired value. The value of the output of ref 127 is representative of the desired value. Resistors 130 and 131 along with capacitor 132 integrate the PS signal to form an integrated signal at a node 133 that is representative of the average value of current 20. If the value of the integrated signal is less than the value from ref 127, the output of comparator 128 has a value that does not affect the signal from the output of comparator 51. If the integrated signal is greater than the value from ref 127, the output of comparator 128 goes high and pulls the reset input of latch 54 high. Pulling the output of comparator high resets latch 54 and shortens the on-time of transistor 36 thereby reducing the value of secondary current 20. Typically, the output driver of comparator 128 has an open drain output with a high side transistor but not a low side transistor so that the output may only pull the output of comparator 51 high but not low.

Subsequently, when the value of the Dmag (DM) signal decreases to a value less than the value of reference 59, the output of comparator 58 goes high to set latch 54 and force the switching control (SC) signal high again. The high SC signal enables switch 36 and causes current 35 to once again flow through inductor 18. Transistor 36 remains enabled until the ES signal crosses the value of the CS signal which again resets latch 54. The low going signal from latch 54 causes edge detector 73 to form a short pulse which again briefly enables transistor 80 to transfer the signal stored on capacitor 78 to capacitor 86.

The relationship between the pseudo (PS) signal and current 20 is shown by the following equations:

$$I20 = (I35_{peak}/Np) - (((VO+VF)/LS)*Toff)$$

where;
- I20—value of current 20,
- $I35_{peak}$—peak value of current 35,
- Np=N20/N18—turns ratio of winding 20 divided by winding 18,
- VO—the value of the output voltage,
- VF—the forward voltage across diode 22,
- LS—inductance of winding 19, and
- Toff—the time required for current 20 to become zero.

When transistor 36 is turned off by controller 40, the value of the error signal (ES) and the value of the current control (CS) signal on input 46 are equal as shown below:

$$Ves = Vcc = R37 * I35_{peak}$$

where;
- Ves—the value of the error signal ES,
- Vcc—the value of the current control signal CC on input 46, and
- R37—the value of resistor 37.

Solving the Ves equation for I35 and substituting it into the equation for I20 results in;

$$I20 = ((Ves/(R37*Np)) - (((VO+VF)/LS)*Toff)$$

When transistor 36 turns off, the AX voltage increases to a peak as illustrated at time T0. At time T0, the voltage across diode 22 is at a maximum value as illustrated by plot 93. As current 20 decreases, the voltage across diode 22 decreases. The AX voltage does not have the variation caused by diode 22 so the AX voltage begins at a higher value than the voltage across winding 19. Since current 85 is formed from the AX voltage the voltage stored on capacitor 86 begins decaying according to:

$$PS = Ves - (I85/C86)*T$$

Current 85 can be expressed as:

$$I85 = Vax/R16*SR83$$

and Vax can be expressed as:

$$Vax = (N_2)(VO+VF)$$

where;
- PS—the value of the PS signal,
- I85—the value of current 85 through transistor 84,
- C86—the value of capacitor 86,
- T—the time to discharge capacitor C86,
- Vax—the value of the AX voltage on terminal 27,
- SR83—the size ratio between transistors 83 and 84, and
- N2—the turns ratio between windings 19 and 21 (N19/N21).

Substituting the equation for Vax into the equation for I85 and substituting the equation for I85 into the equation for PS yields;

$$PS = Ves - ((N_2(VO+VF))/(R16*C86)).$$

Solving the above equation of PS and the equation of I19 for the common term Ves and setting the equations equal to each other yields;

$$((R37*Np)/(R16*C86)) = (1/L19)$$

Solving the above for the external components that are selected to control the PS signal yields;

$$R16*C86 = R37*Np*L19$$

Generally, the values of the turns ratio and the inductance of transformer 17 are difficult to select. Thus, the value of capacitor 86 and the value of resistors 16 and 37 can be selected to provide the desired behavior for the PS signal. In the preferred embodiment, controller 40 is formed on a semiconductor die and capacitor 86 is formed on the same semiconductor die. In this preferred embodiment, the value of resistors 16 and 37 can be selected to make the above equation balance and control the operation of system 10 to make the value and the waveshape of the PS signal substantially proportional to the value and waveshape of current 20. This results in controller 40 using the value of the output voltage at substantially the zero crossing of current 20 in order to regulate the value of the output voltage.

A first terminal of resistor 15 is commonly connected to terminal 27 of winding 21 and a first terminal of resistor 16. A second terminal of resistor 16 is connected input 47. Input 47 is commonly connected to a drain and a gate of transistor 83 and a gate of transistor 84. A source of transistor 83 is commonly connected to a source of transistor 84 and to return 42. A drain of transistor 84 is commonly connected to node 81, an inverting input of comparator 88, a first terminal of resistor 131, a first terminal of capacitor 86, and a source of transistor 80. A second terminal of capacitor 86 is connected to return 42. A second terminal of resistor 131 is commonly connected to a first terminal of resistor 130, a first terminal of capacitor 132, and an inverting input of comparator 128. A second terminal of resistor 130 is commonly connected to a second terminal of capacitor 132 and to return 42. A non-inverting input of comparator 128 is connected to the output of ref 127. An output of comparator 128 is connected to the output of comparator 51. A drain of transistor 80 is commonly connected to node 79, a non-inverting input of comparator 51, a first terminal of capacitor 78, and a first terminal of resistor 75. A second terminal of capacitor 78 is connected to return 42. A second terminal of resistor 75 is commonly connected to an output of amplifier 74 and a first terminal of resistor 76. A second terminal of resistor 76 is commonly connected to a first terminal of resistor 77 and an inverting input of amplifier 74. The non-inverting input of amplifier 74 is connected to the output of Ref. 72. A second terminal of resistor 77 is commonly connected to a first terminal of capacitor 67 and a source of transistor 68. A second terminal of capacitor 67 is connected to return 42. A drain of transistor 68 is connected to input 43. A gate of transistor 68 is connected to the output of edge detector 90. An input of edge detector 90 is connected to the output of comparator 88. A non-inverting input of comparator 88 is connected to the output of ref 89. A gate of transistor 80 is connected to the output of edge detector 73 which has an input commonly connected to the Q output of latch 54 and an input of buffer 61. An output of buffer 61 is connected output 45. A set input of latch 54 is connected to the output of comparator 58. An inverting input of comparator 58 is connected to input 46 and a non-inverting input of comparator 58 is connected to the output of ref 59. A reset input of latch 54 is connected to the output of comparator 51. An inverting input of comparator 51 is connected to input 46. Input 43 of controller 40 is commonly connected to a first terminal of resistor 15 and a first terminal of resistor 25. A second terminal of resistor 25 is connected to return 12. A second terminal of resistor 15 is connected to terminal 27 of winding 21.

Figure 3:
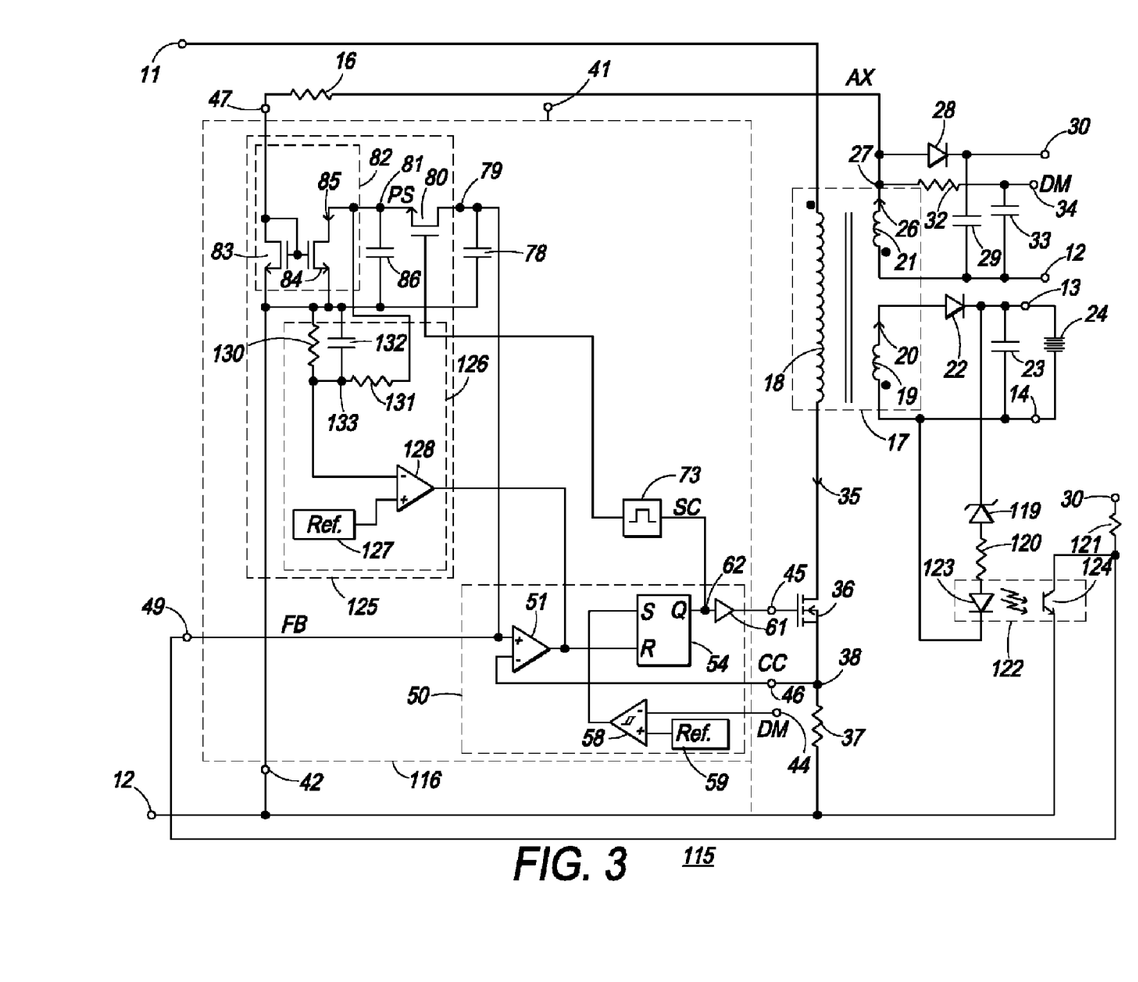
FIG. 3 schematically illustrates an embodiment of a portion of another power supply system in accordance with the present invention.

FIG. 3 schematically illustrates an exemplary form of an embodiment of a portion of a power supply system 115 that is connected in a quasi-resonant flyback configuration. System 115 operates in the discontinuous mode. System 115 is an alternate embodiment of system 10 that was described in the description of FIG. 1 and FIG. 2. System 115 is similar to system 10 but has a feedback network and includes a controller 116 that is an alternate embodiment of controller 40 that was described in the description of FIG. 1 and FIG. 2. The feedback network includes resistors 120 and 121, a zener diode 119, and an optical coupler 122 that has an optical emitter 123 and an optical detector such as a photo-transistor 124. The feedback (FB) network forms a feedback (FB) signal that is representative of the value of the output voltage. Other well-known feedback networks may be used instead of the one illustrated in FIG. 3. Controller 116 receives the FB signal on a FB input 49. Controller 116 includes a pseudo signal generator circuit 125 that is similar to circuit 65 that was described in the description of FIG. 1 and FIG. 2 but circuit 125 does not include ZCD 87. Additionally, controller 116 does not include sampling circuit 66 and error amplifier 74.

Instead of using the error (ES) signal from amplifier 74 to form the PS signal, controller 116 uses the FB signal received on input 49. Controller 116 stores the value of the feedback (FB) signal on capacitor 78. Pseudo signal generator circuit 125 transfers the stored value of the FB signal from capacitor 78 to capacitor 86 when the switching control signal (SC) goes low to disable transistor 36. Decay matching circuit 82 discharges capacitor 86 at a rate that is substantially equal to the rate at which current 20 decays so the value and waveshape of the PS signal is proportional to the value and waveshape of current 20. Circuit 126 uses the PS signal to limit the value of current 20 as described for circuit 125 in the description of FIG. 1 and FIG. 2.

Those skilled in the art will appreciate that integrator circuit 125 may have various implementations as long as it integrates the value of the PS signal and causes a reduction in the on-time of transistor 36 if the value of current 20 exceeds a desired value. For example, comparator 128 and ref 127 may be replaced by a bipolar transistor with the emitter connected to return 42. The base may be connected to node 133 or through another resistor to node 133.

Figure 4:
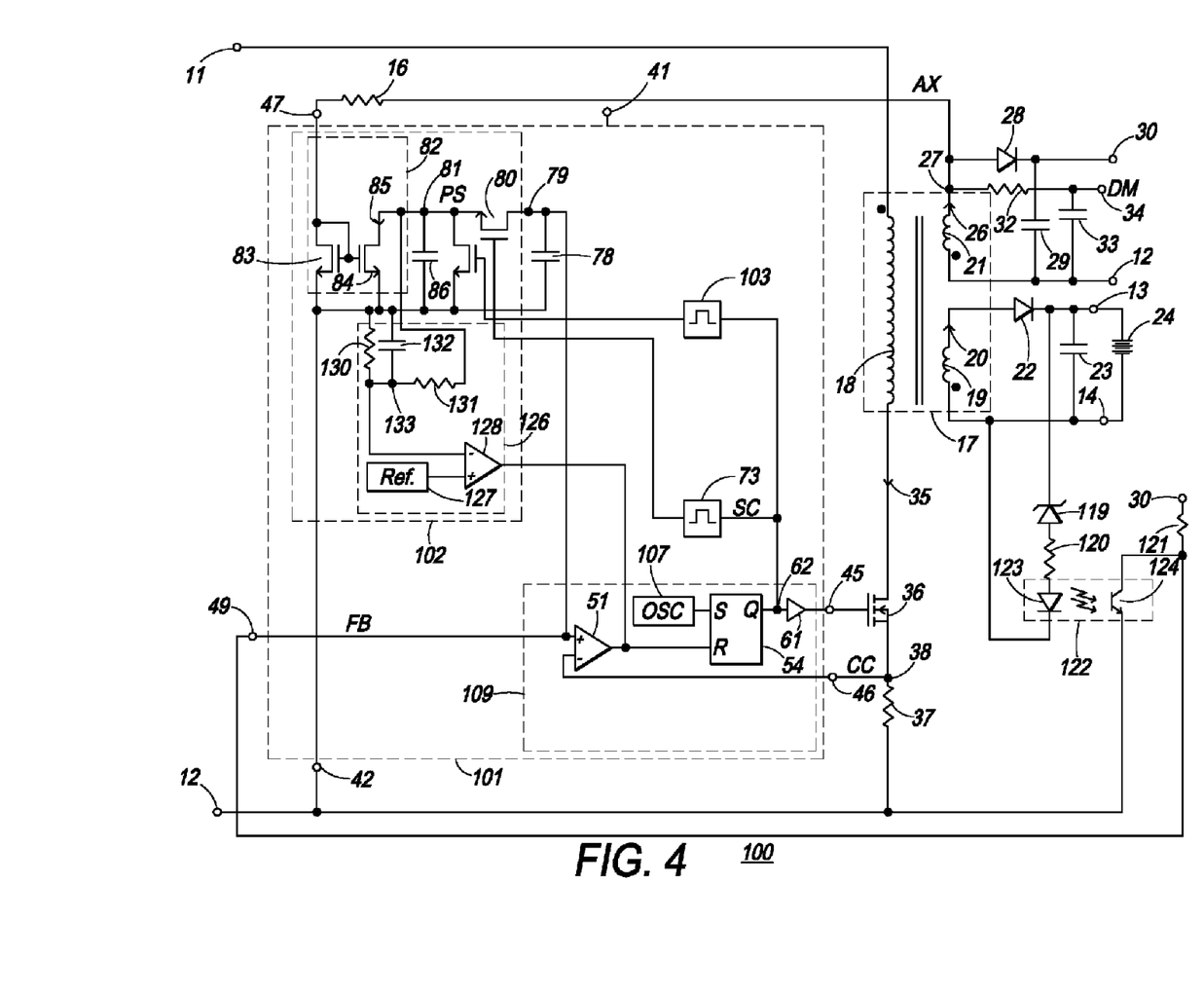
FIG. 4 schematically illustrates an embodiment of a portion of yet another power supply system in accordance with the present invention.

FIG. 4 schematically illustrates an exemplary form of an embodiment of a portion of a power supply system 100 that is an alternate embodiment of system 115 that was explained in the description of FIG. 3. System 100 is similar to system 115 except that system 100 is configured to operate in a fixed frequency and continuous conduction mode with current control. System 100 includes a power supply controller 101 that is an alternate embodiment of controller 116 that was explained in the description of FIG. 3. Controller 101 is similar to controller 116 except that controller 101 includes a pseudo signal generator circuit 102 that is an alternate embodiment of circuit 125 and a switching control section 109. Switching control section 109 is similar to section 50 except that section 109 includes a fixed frequency oscillator 107 and does not use comparator 58, ref 59, and input 44. Circuit 102 is similar to circuit 125 except that circuit 102 includes a negative edge detector 103 and a switch such as a transistor 104. When the SC signal goes high, negative edge detector 103 forms a short pulse that enables transistor 104 for a time that is sufficient to discharge capacitor 86. This allows system 100 to operate in the continuous conduction mode instead of the discontinuous conduction mode as used by system 115.

Those skilled in the art will appreciate that system 100 may also operate in the discontinuous conduction mode by choosing the inductance values of transformer 17 to provide such operation.

Figure 5:
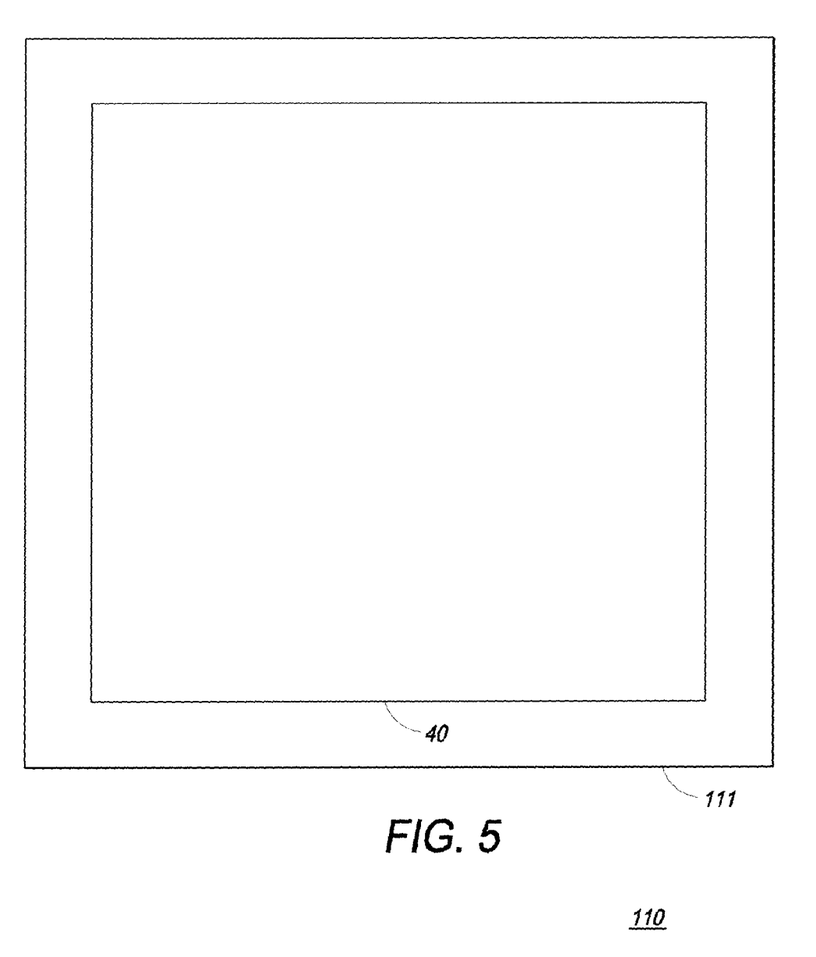
FIG. 5 schematically illustrates an enlarged plan view of a semiconductor device that includes a portion of the power supply system of FIG. 1 in accordance with the present invention.

FIG. 5 schematically illustrates an enlarged plan view of a portion of an embodiment of a semiconductor device or integrated circuit 110 that is formed on a semiconductor die 111. Controller 40, or alternately controller 116, is formed on die 111. Die 111 may also include other circuits that are not shown in FIG. 5 for simplicity of the drawing. Controller 40 and device or integrated circuit 110 are formed on die 111 by semiconductor manufacturing techniques that are well known to those skilled in the art.

In view of all of the above, it is evident that a novel device and method is disclosed. Included, among other features, is forming a controller to use the value of the AX voltage at approximately the zero crossing of the secondary current to form a feedback signal to use in regulating the output voltage.

The value of the feedback signal is also used to form a pseudo signal that is used to determine the zero crossing of the current in the secondary. Using the pseudo signal provides an accurate determination of the secondary voltage. Using the auxiliary voltage at the zero crossing removes the effect of the secondary side rectifier diode and improves the accuracy of the regulation.

While the subject matter of the invention is described with specific preferred embodiments, it is evident that many alternatives and variations will be apparent to those skilled in the semiconductor arts. For example, pseudo signal generator circuit 65 may have various other embodiments such as an analog-to-digital converter. Additionally the storage elements such as capacitor 86 could be implemented as digital storage elements. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A battery charger comprising:
a switching controller configured to form a switching control signal suitable to control a power switch to control current through a primary inductor of a transformer;
a pseudo generator circuit configured to receive an auxilary voltage from an auxiliary winding of the transformer and generate a current sense signal that is representative of current flow through a secondary winding of the transformer;
a sampling circuit configured to sample the auxiliary voltage at a substantially zero crossing of the current sense signal and form a sampled signal responsively to the current sense signal;
an error amplifier coupled to receive the sampled signal and form an error signal wherein the switching controller uses the error signal to form the switching control signal and wherein the pseudo generator circuit is copied to receive the error signal and store a first signal that is representative of the error signal, and configured to decay the first signal at a first rate that is representative of a decay rate of the current flow through the secondary winding; and
a current limit circuit configured to receive the current sense signal and terminate an on-cycle of the switch responsively to a first value of the current sense signal.

2. The battery charger of claim 1 wherein the switching controller and the auxiliary voltage have a common reference.

3. The battery charger of claim 1 wherein the pseudo generator circuit stores a feedback signal that is representative of the output voltage on first a storage capacitor, charges a second capacitor to a value representative of the error signal stored. on the first capacitor, and discharges the second capacitor at the first rate.

4. The battery charger of claim 1 further including a sampling circuit configured to form a first stored signal that is representative of the error signal from an error amplifier, sample the first stored signal and form a second stored signal that is representative of the first stored signal, and a decay the second stored signal at a rate that is representative of the decay rate of the current flow through the secondary winding.

5. The battery charger of claim 1 wherein the current limit circuit includes an integrator operably coupled to integrate the current sense signal and to terminate the on-cycle of the switching control signal responsively to the first value.

6. The battery charger of claim 5 further including a comparator configured to compare a result of the integration of the current sense signal to a reference value.

7. A method of forming a power supply controller comprising:
configuring a switching controller to form a switching control signal suitable to control a power switch to control current through a primary inductor of a transformer to regulate an output voltage on a secondary winding of the transformer;
configuring the power supply controller to receive a sense signal that is representative of an auxiliary voltage from an auxiliary winding of the transformer and form a current sense signal that is representative of current flow through the secondary winding including configuring the power supply controller to store an error signal from an error amplifier to form a stored value and to decay the stored value at a rate that is representative of a decay rate of the current flow through the secondary winding; and
configuring a current limit circuit to receive the current sense signal and cause the power switch to be disabled responsively to a first value of the current sense signal.

8. The method of claim 7 wherein configuring the current limit circuit to receive the current sense signal includes operably coupling the current sense signal to form an average value of the current sense signal and compare the average value to a reference value.

9. The method of claim 7 further including configuring the power supply controller to receive a feedback signal that is representative of the output voltage and use the feedback signal to form the current sense signal.

10. The method of claim 9 wherein configuring the current limit circuit to receive the current sense signal includes operably coupling the current sense signal to form an average value of the current sense signal and compare the average value to a reference value.

11. A method of forming a power supply controller comprising:
configuring a switching controller to form a switching control signal suitable to control a power switch to control current through a primary inductor of a transformer to regulate an output voltage on a secondary winding of the transformer;
configuring the power supply controller to use an auxiliary voltage from an auxiliary winding of the transformer to form a current sense signal having a zero crossing that is substantially the same as a zero crossing of a current through the secondary winding;
configuring the power supply controller to store a value of the auxiliary voltage at the zero crossing as a feedback signal that is representative of a value of the output voltage;
configuring the power supply controller to use the current sense signal to limit a value of the current through the secondary winding to no greater than a first value.

12. The method of claim 11 wherein. configuring the power supply controller to use the auxiliary voltage includes configuring the switching controller to be referenced to a common voltage to which the auxiliary winding is referenced.

13. The method of claim 11 further including configuring an error amplifier to use the auxiliary voltage from the auxiliary winding to form an error signal that is representing a deviation of the output voltage from a desired value of the output voltage, and configuring the power supply controller to use the error signal to form the current sense signal.

14. The method of claim 11 further including configuring the power supply controller to receive a feedback signal that is representative of the output voltage, and configuring the power supply controller to use the feedback signal to form the current sense signal.

15. The method of claim 11 wherein configuring the power supply controller to use the current sense signal includes operably coupling a current limit circuit to receive the current sense signal, form a signal that is representative of an average value of the current sense signal, and compare the average value to a signal that is representative of the first value.

* * * * *